(12) United States Patent
Tsai et al.

(10) Patent No.: US 6,737,167 B2
(45) Date of Patent: May 18, 2004

(54) NEAR-FIELD SUPER-RESOLUTION OPTICAL COVER GLASS SLIP OR MOUNT

(75) Inventors: Din-Ping Tsai, Taipei (TW); Yu-Hsuan Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 10/307,370

(22) Filed: Dec. 2, 2002

(65) Prior Publication Data

US 2003/0211336 A1 Nov. 13, 2003

(30) Foreign Application Priority Data

May 13, 2002 (TW) .......................... 91109862A

(51) Int. Cl.$^7$ .................. B32B 17/06; B32B 15/04; G02B 21/34
(52) U.S. Cl. .................. 428/432; 428/428; 428/697; 428/698; 428/699; 428/701; 428/702; 428/704; 359/396
(58) Field of Search ................ 428/426, 428, 428/432, 697, 689, 699, 701, 702, 704; 359/396

(56) References Cited

U.S. PATENT DOCUMENTS

| | | | | |
|---|---|---|---|---|
| 5,280,384 A | * | 1/1994 | Shibasaki | 359/396 |
| 6,226,258 B1 | * | 5/2001 | Tominaga et al. | 369/283 |
| 6,381,013 B1 | * | 4/2002 | Richardson | 356/305 |

* cited by examiner

*Primary Examiner*—Deborah Jones
*Assistant Examiner*—G. Blackwell-Rudasill
(74) *Attorney, Agent, or Firm*—Birch, Stewart, Kolasch & Birch, LLP

(57) ABSTRACT

This invention is a super-resolution optical cover glass slip or mount which can resolve the optical information on a sample surface without diffraction limit. This super-resolution optical cover glass slip or mount is a multi-layered body at least comprising: (a) a substrate of transparent material; (b) a first protective and spacer layer formed on one surface of the substrate, which is made from transparent dielectric material; (c) a nano structure thin film which is capable of causing localized non-linear near-field optical interaction; (d) a second protective and spacer layer formed on the localized non-linear near-field optical interaction layer, which is also made from transparent dielectric material.

16 Claims, 5 Drawing Sheets

NEAR-FIELD SUPER-RESOLUTION OPTICAL COVER GLASS SLIP OR MOUNT

This nonprovisional application claims priority under 35 U.S.C. §119(a) on patent application Ser. No. 091109862 filed in TAIWAN, R.O.C. on May 13, 2002, which is herein incorporated by reference.

FIELD OF THE INVENTION

The present specification generally relates to a near-field super-resolution optical cover glass slip or mount, and more specifically to a near-field super-resolution optical cover glass slip or mount capable of resolving the optical information on the sample surface without optical diffraction limit.

BACKGROUND OF THE INVENTION

The conventional optical cover glass slip or mount is used to fix and carry the sample in coordination with the conventional optical microscope to carry out optical microscopic observation. The conventional optical microscopic observation is conducted using far-field optical observation (i.e. the distance between sample and sensor is much larger than the optical wavelength used for microscopic observation). It is unavoidable that an optical interference or diffraction phenomena will occur due to the wave characteristics of optics, and the spatial resolution of the conventional optical microscope is limited by the optical diffraction limit ($1.22 \lambda/2n \sin \theta$, where $\lambda$ is the wavelength of the light used for the observation, n is the refractive index of the medium, and $\theta$ is the half angle of the aperture). To increase the spatial resolution of the conventional optical microscopy, it is required to use the light source with much shorter wavelength such as blue light, or to use an objective lens with high numerical aperture value or to operate the microscopic observation in high refractive index medium condition.

An approach to breaking through the optical diffraction limit, as indicated in U.S. Pat. No. 4,917,462, is near-field scanning optical microscopy (NSOM). By using an optical fiber probe with an aperture of several tenths of nanometers NSOM can perform precise near-field optical observation on the surface of a sample, and the information of near-field optical interactions can be acquired. Because the optical information is obtained from the near field, there is no optical diffraction limit. The spatial resolution of NSOM depends on the local region of the near-field optical interactions between the sample and fiber probe, and are thus mainly related to the size of the optical aperture of the fiber probe and the precision of the scanning control of NSOM system.

The other patents, U.S. Pat. Nos. 4,917,462, 5,894,122, 5,994,691, 6,194,711 also proposed a near-field scanning optical microscope (NSOM) technique which can break through the optical diffraction limit; however, the NSOM scanning system needs a very precise feed back control, and ultimately will slow down the scanning speed, and will also restrict the scanning area to a limited region. The optical fiber probe of NSOM is fragile and easily damaged during microscopic observation as well.

In applications of the near-field optical storage, in order to overcome the drawbacks mentioned above, and to develop a commercial near-field optical recording product, U.S. Pat. Nos. 6,226,258, 6,319,582, 6,340,813 by Dr. Junji. Tominaga disclosed that additional double layers of nanometer-scale thin films in the structure of the normally used phase-changed optical disk could perform the near-field optical recording. These two layers of thin films are 20 nm of SiN and 15 nm of Sb, respectively, which are used to replace the function of the optical fiber probe of the NSOM, and to carry out the read/write actions beyond the optical diffraction limit.

SUMMARY OF THE INVENTION

The present invention applies a similar aforementioned ultrahigh density near-field optical recording method to the field of super-resolution optical microscopic technique. A layer of nano structure which is capable of producing localized nonlinear near-field optical interactions, and a second layer of optical transparent dielectric thin film which is capable of protecting the previous nano thin film, and maintaining the optical interactions of the previous nano thin film within the near field to obtain the super-resolution beyond the optical diffraction limit.

The near-field super-resolution optical cover glass slip of the this invention is designed to coat a nanometer structured thin film on the glass, and the focused light will excite the localized near field of this nano structured thin film which is then coupled to the nano-structure of the observed entity to obtain the optical information of the sample surface within the near field distance. The near-field super-resolution optical cover glass slip can easily fix and carry the sample as the conventional optical cover glass slip does. The usage of the near-field super-resolution optical cover glass slip can directly increase the spatial resolution of the conventional scanning optical microscopy beyond the optical diffraction limit, and preserve all the advantages of the conventional scanning optical microscope.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
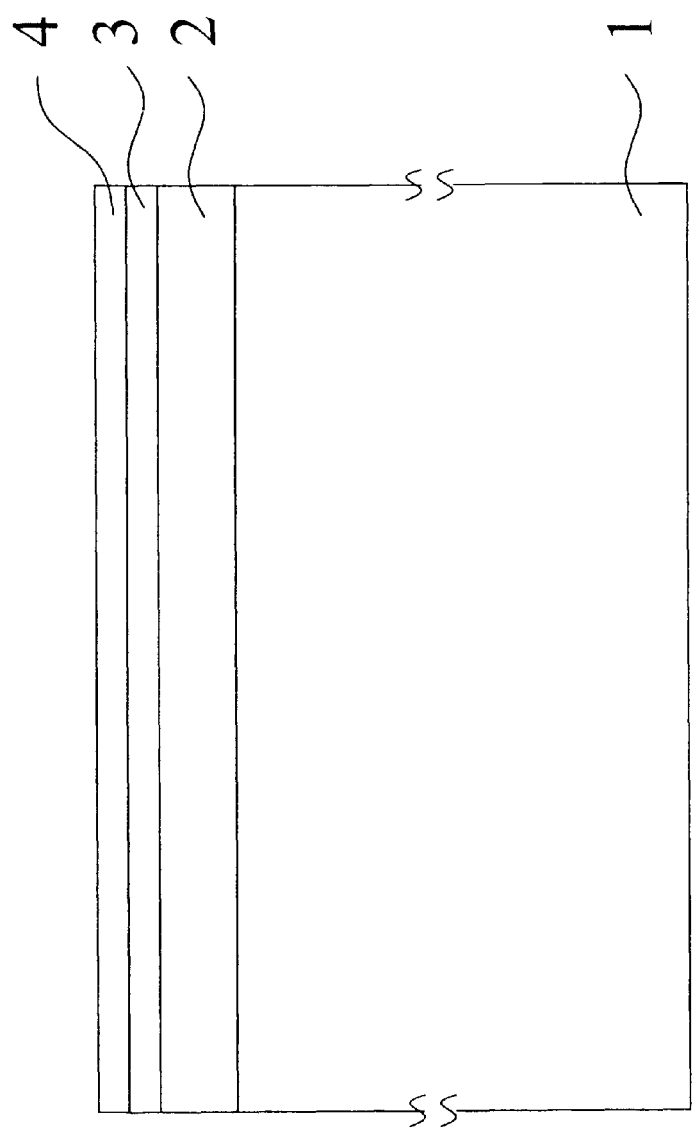
FIG. 1 depicts a structure diagram showing the near-field super-resolution optical cover glass slip or mount.

One embodiment of a near-field super-resolution optical cover glass slip or mount in accordance with the present invention is shown in a diagram of FIG. 1. The typical structure of the system comprises an optical transparent base substrate 1 and at least three layers of thin film covering the optical transparent base substrate 1. The three thin film layers are: the first optical transparent dielectric thin film layer 2, a nano structured thin film layer 3 capable of producing a localized nonlinear near-field optical interactions, and a second optical transparent dielectric thin film layer 4.

The optical transparent base substrate 1 may be made of SiO2 glass material, doped SiO2 glass material, or transparent polymer material. The material used for forming the first optical transparent dielectric thin film 2 and the second optical transparent dielectric thin film layer 4 is selected from one of a number of suitable dielectric material: ZnS—SiO2, ZnS—SiOx, SiO2, SiOx, or SiNx. The first optical transparent dielectric thin film layer 2 and the second optical transparent dielectric thin film layer 4 may be formed as a multilayer structure. The ideal thickness of the first optical transparent dielectric thin film layer 2 is typically in a range of about 100 nm to 200 nm, while the ideal thickness of the second optical transparent dielectric thin film layer 4 is typically in a range of about 5 nm to 100 nm. The material used for forming the nano structured thin film layer 3 capable of producing a localized nonlinear near-field optical interactions is selected from the following elements: Zn, Si, Ni, Sb, Ag, Ge, Al, Cu, Pt, Co, Mn, Cr, Ti, Na, Ga, As, Se, In, Sn, Te and Au. The material used for forming the nano structured thin film layer 3 may also be selected from the following oxidation material: ZnOx, SiOx, GeOx, NiOx, SbOx, AlOx, AgOx, CuOx, CoOx, MnOx, CrOx, TiOx, GaOx, InOx, and SnOx. The material used for forming the nano structured thin film layer 3 which is capable of producing a localized nonlinear near-field optical interactions may either appear as an element, a compound, or a composite, and the ideal thickness of the nano structure is typically in a range of about 5 nm to 100 nm.

Figure 2:
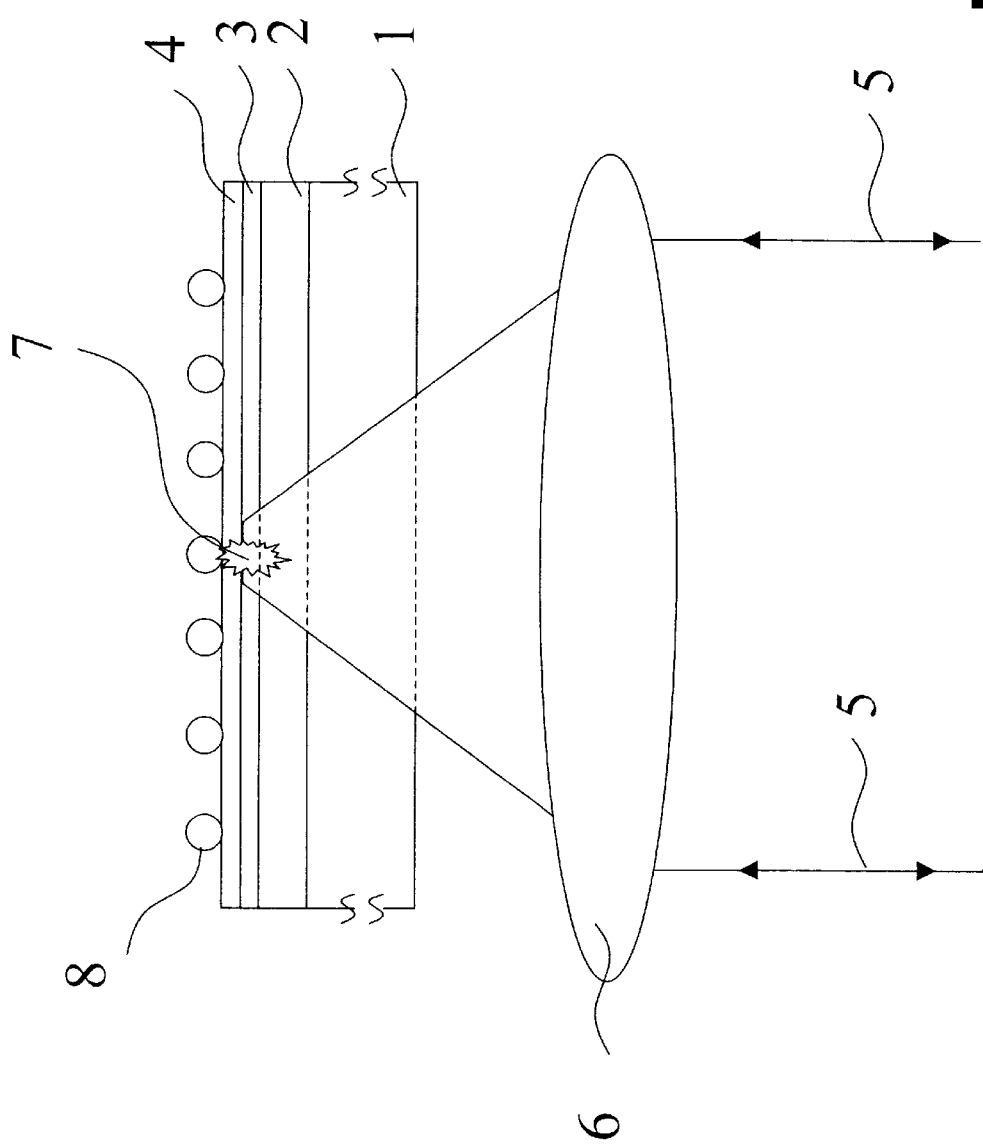
FIG. 2 is a schematic illustration showing the working principle of the near-field super-resolution optical cover glass or mount in the present invention.

FIG. 2 depicts a diagram showing the working principle of the near-field super-resolution optical cover glass slip or mount in the present invention. The light beam 5 emitted from the source is guided from the optical lens 6 of the scanning optical microscope 10 to the optical transparent base substrate 1, and then focused on the surface of the localized nonlinear near-field optical nano structured thin film layer 3. The focused light will excite the localized near-field optical interaction 7 without diffraction limit at the nano structured thin film layer 3. This localized near-field optical interaction 7 is then coupled to the nano structures of the sample surface 8 on the surface of the second optical transparent dielectric thin film layer 4 within the near field distance. Near-field optical information of the nano structures of the sample surface 8 can be consequently obtained without diffraction limit. Through the working steps mentioned above, the spatial resolution of the conventional scanning optical microscope 10 can be improved, and a new near-field optical microscopic technique is developed with a super-resolution capability without the optical diffraction limit. Two-dimensional scan of the focused light beam in coordination with the movement of the sample, the information of super-resolution near-field optical interactions can be obtained. For example, the near-field optical image with super-resolution, or super-resolution near-field optical imaging spectroscopy can be acquired for practical applications. In addition, the first and the second optical transparent dielectric thin film layers 2 and 4 positioned on the top and bottom of the nano structured thin film layer 3, respectively, are designed for protecting the nano structured thin film layer 3 and maintaining localized nonlinear near-field optical interactions in a steady state. The second optical transparent dielectric thin film layer 4 also acts as a role to keep the sample and the nano structured thin film layer 3 within a constant near-field distance.

Figure 3:
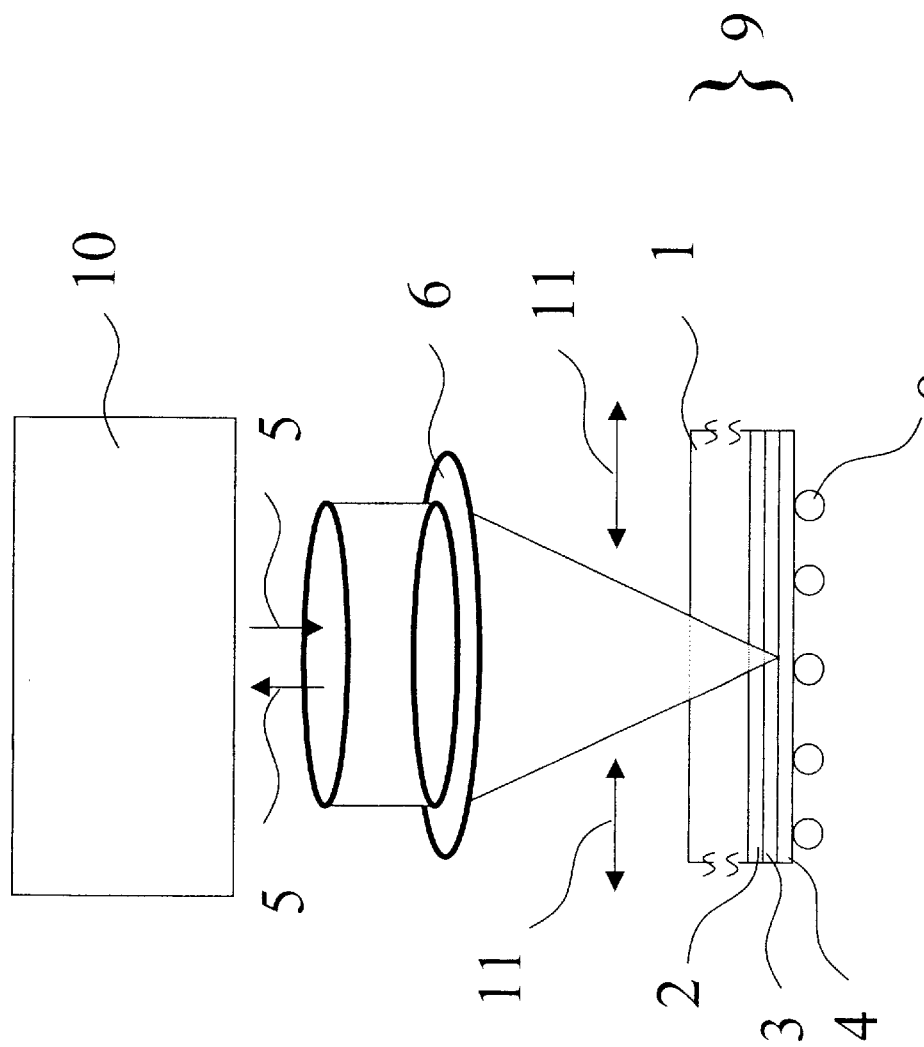
FIG. 3 is a schematic illustration showing one preferred embodiment of the near-field super-resolution optical cover glass slip or mount in coordination with the scanning optical microscope.
Figure 4:
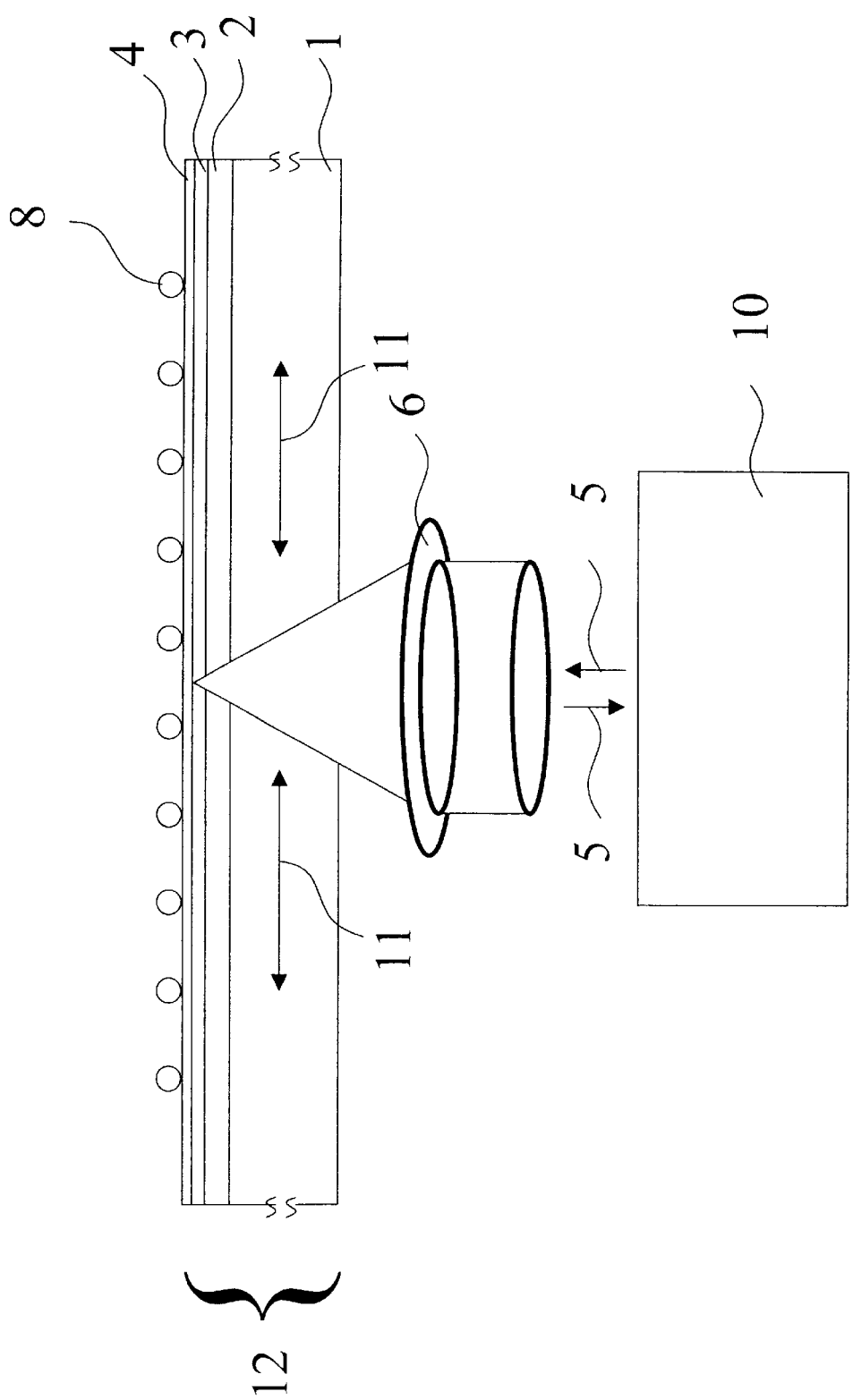
FIG. 4 is a schematic illustration showing another preferred embodiment of the near-field super-resolution optical cover glass slip or mount in coordination with the scanning optical microscope.

FIG. 3 depicts a diagram showing a preferred embodiment in accordance with the present invention. The implementation of the system comprises a near-field super-resolution optical cover glass slip 9 in coordination with the scanning optical microscope. By moving either the sample or the focused spot on the sample, the optical information of the near-field interactions and the precise translation position 11 between the focused spot and the sample on the same plane can form a near-field optical image. That is to say, the near-field super-resolution optical cover glass slip 9 of the present invention can be used to fix the sample as the conventional optical cover glass slip usually does, and also used with the conventional scanning optical microscope 10 to acquire the optical information of the nano structure of sample on the surface of the near-field super-resolution optical cover glass slip. Similarly, in FIG. 4, shows another embodiment in accordance with the present invention. In this embodiment, the near-field super-resolution optical cover glass mount 12 is used to carry the sample as the conventional optical cover glass mount usually does. It can also be used in coordination with the conventional scanning optical microscope 10 to attain the near-field super-resolution function. The implementation of the system described herein may be conducted using the sample of a biological entity or a non-biological entity. The environment of the operation can be in vacuum, atmosphere, water, or even in some solution. The size of the sample can be as small as an entity smaller than the focused light beam, or it can be as large as an entity larger than the focused light beam. Under both of the situations, the near-field super-resolution optical cover glass slip or mount 9 can resolve the optical information of the nano structures within the near-field region.

Figure 5:
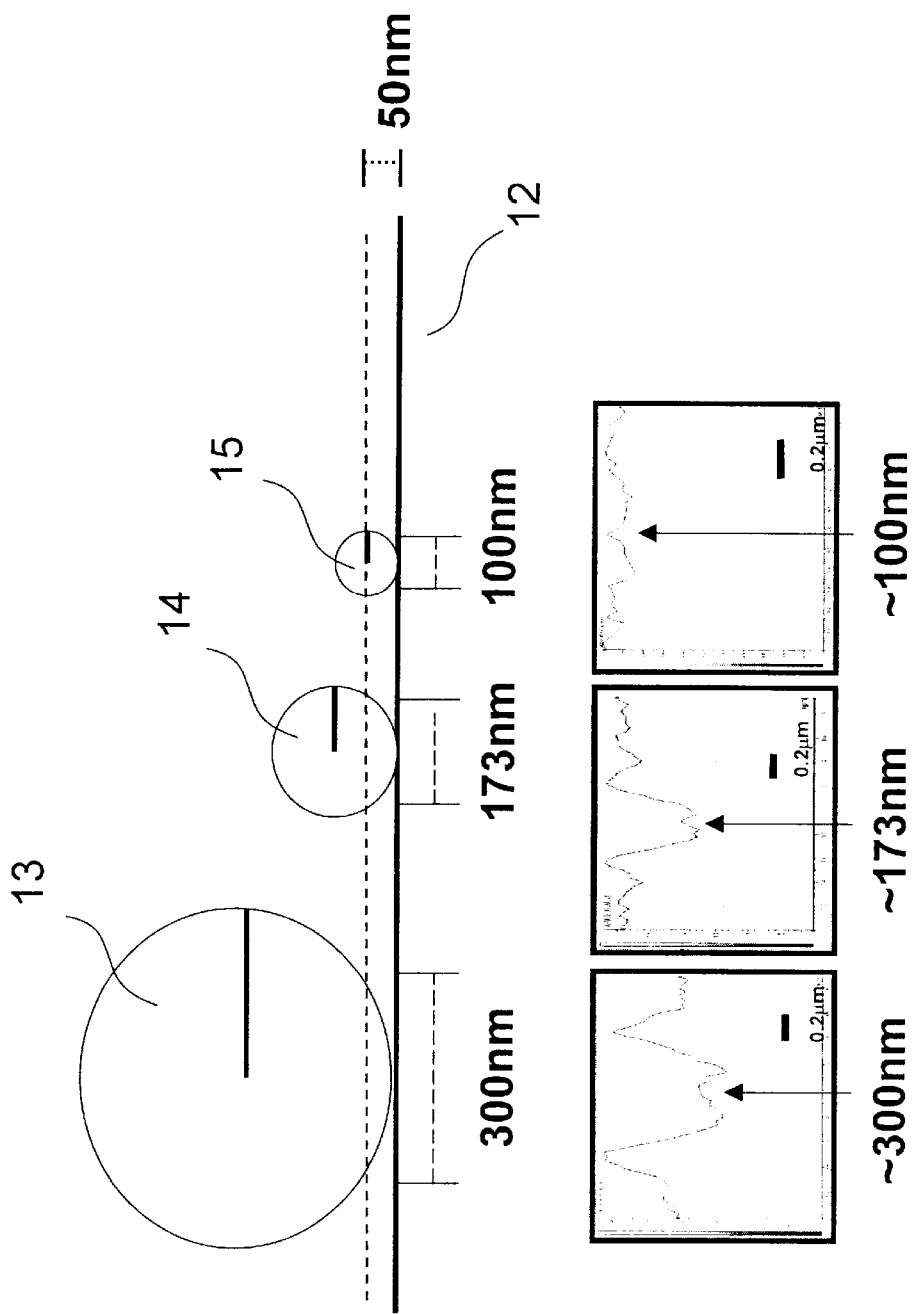
FIG. 5 shows the experimental results of the standard polystyrene particles of the diameters of 500 nm, 200 nm, and 100 nm by applying the near-field super-resolution optical cover glass slip or mount in coordination with the scanning optical microscope.

FIG. 5 shows the sample of a practical measurements and the experimental results using a scanning optical microscope. A 635 nm laser light beam and a scanning optical microscope in coordination with a near-field super-resolution optical cover glass mount 12 on which has the standard polystyrene particles with the diameters of 500 nm, 200 nm, and 100 nm as denoted by 13,14, and 15, respectively. The experimental results show that the optical microscopic image can resolve the three particles clearly including even the standard polystyrene particles of 100 nm diameter 15 which is beyond the diffraction limit. The measured profile of the optical information is evidently shown, and the results of the near-field optical image prove the feasibility of using the near-field super-resolution optical glass slip.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modification and similar structure.

What is claimed is:

1. A near-field super-resolution cover glass slip structure comprising:
   an optical transparent base substrate;
   a nano structured thin film layer capable of producing localized nonlinear near-field optical interactions covering said optical transparent base substrate;

a first optical transparent dielectric thin film layer between said optical transparent base substrate and said nano structured thin film; and a second optical transparent dielectric thin film covering said nano structured thin film layer.

2. The near-field super-resolution cover glass slip structure of claim 1, wherein said optical transparent base substrate is made of SiO2 glass material and doped SiO2 glass material.

3. The near-field super-resolution cover glass slip structure of claim 1, wherein said optical transparent base substrate is made of transparent polymer material.

4. The near-field super-resolution cover glass slip structure of claim 1, wherein the composition of said first optical transparent dielectric thin film and said second optical transparent dielectric thin film can be selected from the group of dielectric material: ZnS—SiOx, SiOx or SiNx.

5. The near-field super-resolution cover glass slip structure of claim 1, wherein said first optical dielectric thin film layer and said second optical dielectric thin film layer can be a multiple layer structure.

6. The near-field super-resolution cover glass slip structure of claim 4, wherein said first optical dielectric thin film layer and said second optical dielectric thin film layer can be a multiple layer structure.

7. The near-field super-resolution cover glass slip structure of claim 1, wherein the ideal thickness of said first optical dielectric thin film layer is in the range of about 100 nm to 200 nm.

8. The near-field super-resolution cover glass slip structure of claim 4, wherein the ideal thickness of said first optical dielectric thin film layer is in the range of about 100 nm to 200 nm.

9. The near-field super-resolution cover glass slip structure of claim 1, wherein the ideal thickness of said second optical dielectric thin film layer is in the range of about 5 nm to 200 nm.

10. The near-field super-resolution cover glass slip structure of claim 4, wherein the ideal thickness of said second optical dielectric thin film layer is in the range of about 5 nm to 200 nm.

11. The near-field super-resolution cover glass slip structure of claim 1, wherein the composition structure of said nano structured thin film layer can be selected from the following elements: Zn, Si, Ni, Sb, Ag, Ge, Al, Cu, Pt, Co, Mn, Cr, Ti, Na, Ga, As, Se, In, Sn, Te and Au.

12. The near-field super-resolution cover glass slip structure of claim 1, wherein the composition structure of said nano structured thin film layer can be selected from the following oxidation materials: ZnOx, SiOx, GeOx, NiOx, SbOx, AlOx, AgOx, CuOx, CoOx, MnOx, CrOx, TiOx, GaOx, InOx, and SnOx.

13. The near-field super-resolution cover glass slip structure of claim 1, wherein said nano structured thin film layer can be an element, a compound, or a composite.

14. The near-field super-resolution cover glass slip structure of claim 11, wherein said nano structured thin film layer is an element, a compound, or a composite.

15. The near-field super-resolution cover glass slip structure of claim 1, wherein the ideal thickness of said nano structured thin film layer is typically in a range of about 5 nm to 100 nm.

16. The near-field super-resolution cover glass slip structure of claim 11, wherein the ideal thickness of said nano structured thin film layer is typically in a range of about 5 nm to 100 nm.

* * * * *